United States Patent
Chabreck et al.

(10) Patent No.: US 9,723,303 B2
(45) Date of Patent: Aug. 1, 2017

(54) SYSTEM FOR GENERATING TEXT DEFINED TEST PATTERNS

(75) Inventors: Thomas E. Chabreck, Tigard, OR (US); Benjamin T. Humble, Beaverton, OR (US); Michael S. Overton, Beaverton, OR (US); Robert W. Parish, Gaston, OR (US)

(73) Assignee: TEKTRONIX, INC., Beaverton, OR (US)

(*) Notice: Subject to any disclaimer, the term of this patent is extended or adjusted under 35 U.S.C. 154(b) by 548 days.

(21) Appl. No.: 13/171,182

(22) Filed: Jun. 28, 2011

(65) Prior Publication Data

US 2012/0050542 A1    Mar. 1, 2012

Related U.S. Application Data

(60) Provisional application No. 61/378,858, filed on Aug. 31, 2010.

(51) Int. Cl.
*H04N 17/04* (2006.01)

(52) U.S. Cl.
CPC .................................. *H04N 17/04* (2013.01)

(58) Field of Classification Search
USPC .................................................. 348/181–183
See application file for complete search history.

(56) References Cited

U.S. PATENT DOCUMENTS

| | | | |
|---|---|---|---|
| 4,268,851 A * | 5/1981 | Heller et al. | 348/181 |
| 4,970,595 A * | 11/1990 | Bloomfield | 348/584 |
| 2002/0031262 A1* | 3/2002 | Imagawa et al. | 382/190 |
| 2008/0052587 A1* | 2/2008 | Troelsen | G06F 11/263 |
| | | | 714/742 |

FOREIGN PATENT DOCUMENTS

| | | | |
|---|---|---|---|
| EP | 0105791 A1 | 4/1984 | |
| EP | 0122124 A2 | 10/1984 | |
| WO | 9524101 A1 | 9/1995 | |

OTHER PUBLICATIONS

"Extron Electronics Interfacing, Switching and Distribution: User's Manual" Copyright 2009.*
EP Search Report for European Patent Application No. 11176031.0, dated Nov. 22, 2012, 10 pages.

* cited by examiner

*Primary Examiner* — Michael Teitelbaum
(74) *Attorney, Agent, or Firm* — Marger Johnson

(57) ABSTRACT

Embodiments of the invention are directed to a system for generating video test pattern signals from definitions contained in a text-based definition file. The definition file allows the user to create generic definitions for test signals that can be interpreted to create test signals in a variety of formats, raster sizes, color spaces, sample structures, frame modes, and bit depths. A parametric generator uses one or more engines to then generate the desired test pattern from the definition file.

29 Claims, 9 Drawing Sheets

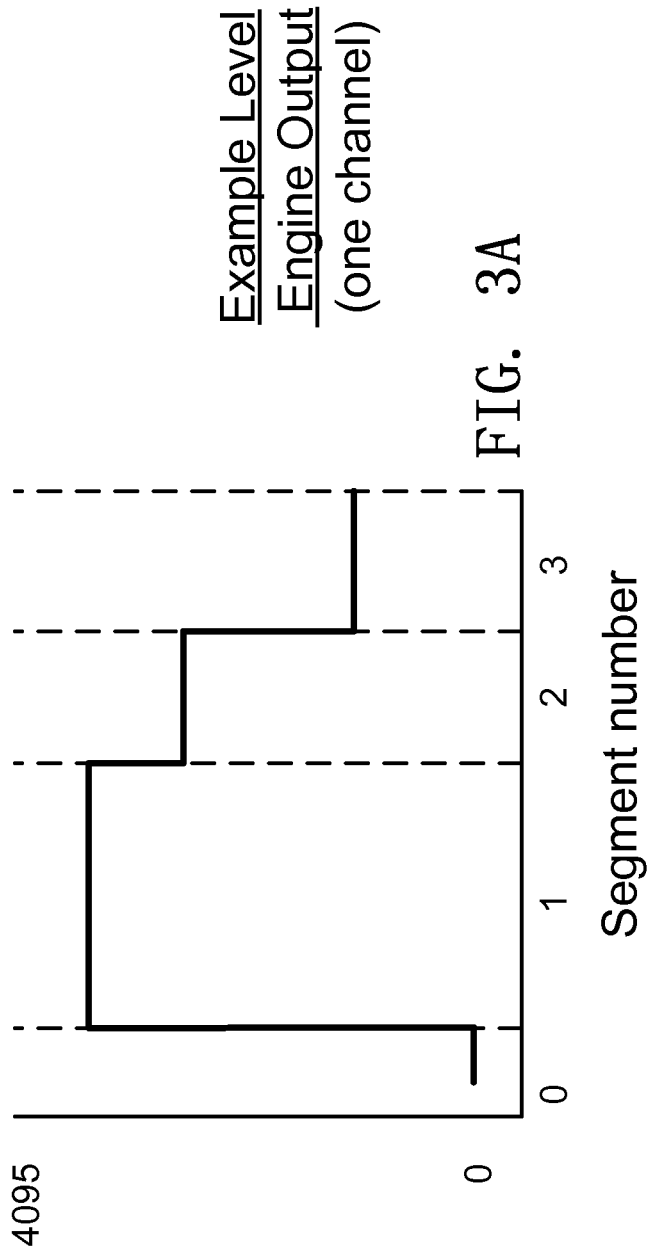

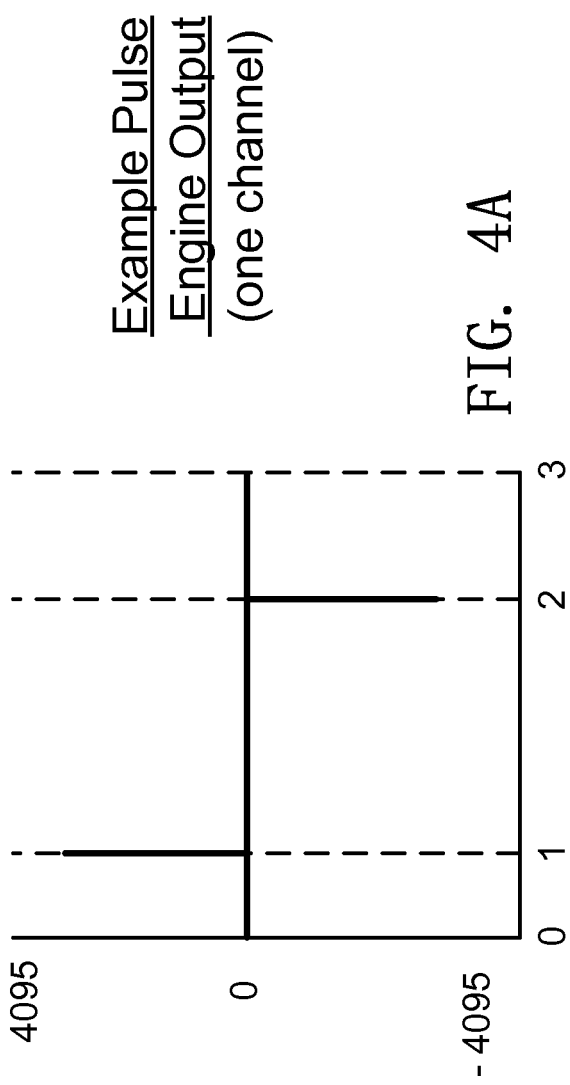

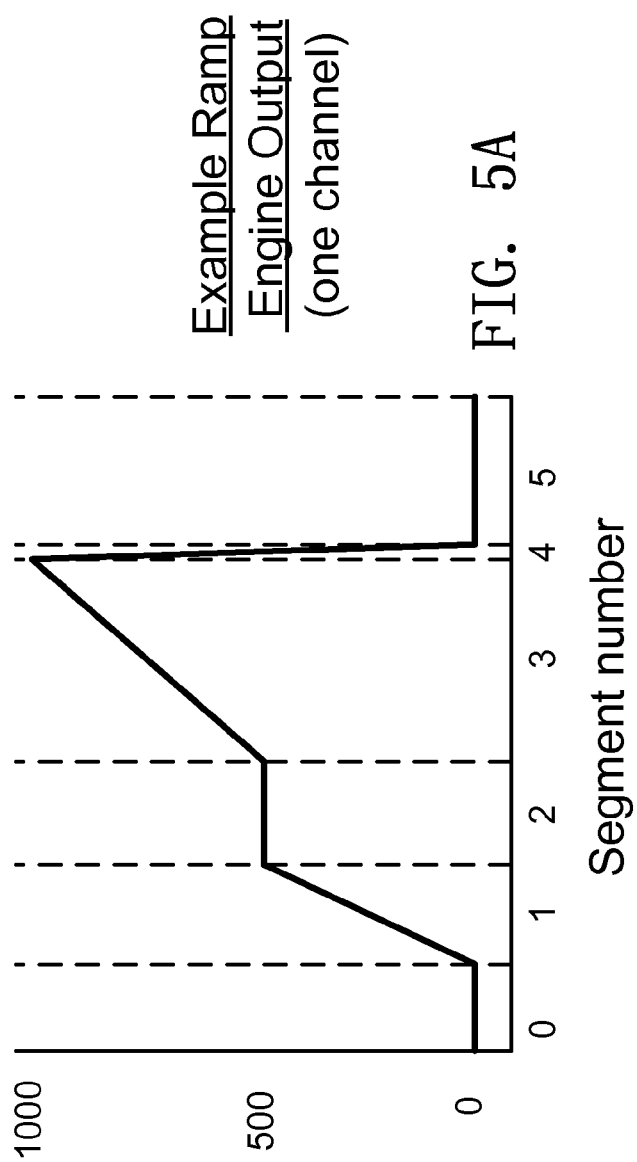

111

```xml
<?xml version="1.0" encoding="utf-8"?>

<signal_set>

<signal name="SMPTE RP219 Color Bars" button="COLOR BAR">
    <description>SMPTE RP219 color bars suitable for all formats. The -I and
                 +Q sub-patterns are included.</description>
    <!-- Generic description for use in 525, 625, 720 and 2K raster sizes -->
    <levels>
      <line name="Pattern 1">
        <level start="0%" rgb="0.4,0.4,0.4" />
        <level start="1/8" rgb="0.75,0.75,0.75" />
        <level start="13/56" rgb="0.75,0.75,0" />
        <level start="19/56" rgb="0,0.75,0.75" />
        <level start="25/56" rgb="0,0.75,0" />
        <level start="31/56" rgb="0.75,0,0.75" />
        <level start="37/56" rgb="0.75,0,0" />
        <level start="43/56" rgb="0,0,0.75" />
        <level start="7/8" rgb="0.4,0.4,0.4" />
      </line>
      <line name="Pattern 2">
        <level start="0%" rgb="0,1,1" />
        <level start="1/8" rgb="0,0.2456,0.412545" />
        <level start="13/56" rgb="0.75,0.75,0.75" />
        <level start="7/8" rgb="0,0,1" />
      </line>
      <line name="Pattern 3">
        <level start="0%" rgb="1,1,0" />
        <level start="1/8" rgb="0.253605,0,0.470286" />
        <level start="13/56" rgb="0,0,0" />
        <level start="7/8" rgb="1,0,0" />
      </line>
      <line name="Pattern 4">
        <level start="0%" rgb="0.15,0.15,0.15" />
        <level start="1/8" rgb="0,0,0" />
        <level start="16/56" rgb="1,1,1" />
        <level start="28/56" rgb="0,0,0" />
        <level start="33/56" rgb="-0.02,-0.02,-0.02" />
        <level start="35/56" rgb="0,0,0" />
        <level start="37/56" rgb="0.02,0.02,0.02" />
        <level start="39/56" rgb="0,0,0" />
        <level start="41/56" rgb="0.04,0.04,0.04" />
        <level start="43/56" rgb="0,0,0" />
        <level start="7/8" rgb="0.15,0.15,0.15" />
      </line>
    </levels>
```

FIG. 6A

SYSTEM FOR GENERATING TEXT DEFINED TEST PATTERNS

CROSS REFERENCE TO RELATED APPLICATION

This application claims the benefit of provisional patent application Ser. No. 61/378,858, filed Aug. 31, 2010, herein incorporated by reference.

FIELD OF THE INVENTION

This disclosure relates generally to generating test pattern signals, and, more particularly to a system that generates the test pattern signals from definitions contained in a text-based definition file.

BACKGROUND

In their most basic operation, devices for producing, transmitting, routing, receiving, storing, encoding, decoding, translating or displaying video signals generate output based on input provided to them. In a test mode, while screen parameters are being tuned or problems diagnosed, video devices, including video displays, such as computer or television monitors, or other types of screens are typically provided with an external test signal, which oftentimes is a pre-determined test pattern. There are many standard test patterns, including various lines and colors so that the display performance may be measured or tuned. There are also many standards for display formats, typically based on parameters for size, resolution, frame rate, color space, etc. Many displays are capable of producing output in multiple different formats.

Present systems for generating test patterns generally take one of three forms. In some systems, particular circuits such as ASICs (Application Specific Integrated Circuits) or FPGAs (Field Programmable Gate Arrays) loaded with proprietary designs are used to generate the test patterns directly from such hardware. In these systems each test pattern is "hard-coded" for each format and cannot be modified once implemented. Other systems use a memory to store a series of binary equations that, when executed by a processor, generate the test patterns. The binary equations are generally stored in memory and are difficult to modify because they use proprietary tools to create and edit the equation files. Additionally, it can be difficult to understand the end result of modifying any of the equations. More commonly, test patterns are directly stored in memories in bitmapped files, with separate memories, or separate portions of a large memory used for each test pattern bitmap. Each display format also requires its own set of test patterns, and the size of the test pattern bitmap increases with each new generation of higher resolution displays.

It is becoming increasingly expensive to produce test pattern generating systems because of the increased resources necessary to produce all of the required patterns in the multitude of formats used in the industry today. Additionally, as described above, it is difficult to modify the test pattern content in prior art systems.

Embodiments of the invention address these and other problems in the prior art.

BRIEF DESCRIPTION OF THE DRAWINGS

FIG. 3A is an example output from one color channel of a level engine and FIG. 3B is a table illustrating how the output was generated, according to embodiments of the invention.

FIG. 4A is an example output from one color channel of a pulse engine and FIG. 4B is a table illustrating how the output was generated, according to embodiments of the invention.

FIG. 5A is an example output from one color channel of a ramp engine and FIG. 5B is a table illustrating how the output was generated, according to embodiments of the invention.

FIGS. 6A and 6B illustrate an example test pattern text file according to embodiments of the invention.

SUMMARY DESCRIPTION

Figure 1:
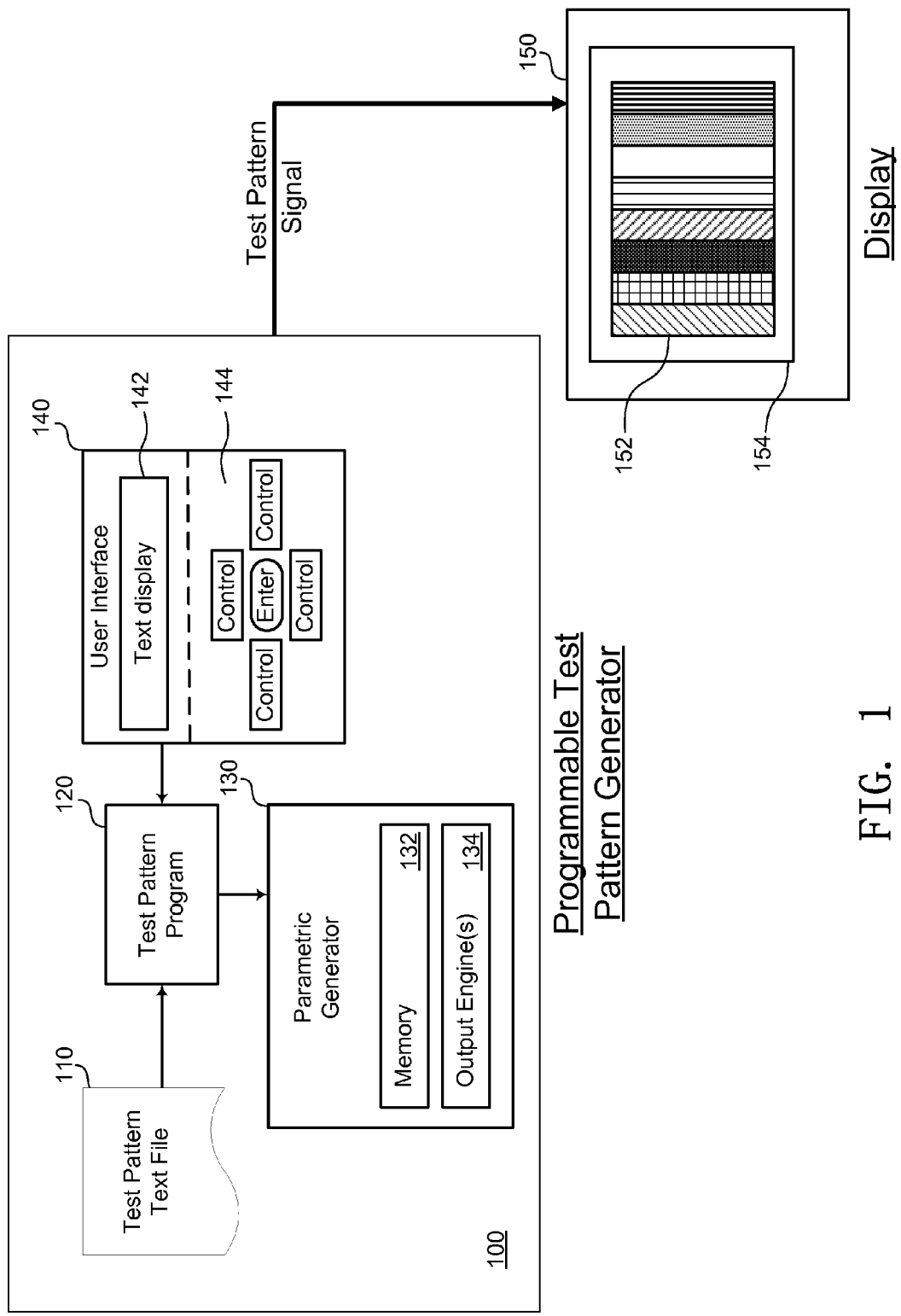
FIG. 1 is a block diagram of a system for generating text defined test patterns according to embodiments of the invention.

Some aspects of the invention are directed to a system for generating test patterns. The system includes a generator that uses information from a definition file, which may be a text or an XML file. The generator then populates a first memory with segment description codes describing segments of a particular test pattern based on the retrieved description information. The segment description codes are processed by a segment processor structured to produce the test pattern, in portions. For instance, the segment processor could create a series of horizontal lines of a video test pattern based on the segment description codes in the first memory. Other aspects of the invention include a second memory structured to store a representation of the particular test pattern by storing a set of indexes for the lines or portions that make up the particular test pattern.

Some embodiments include multiple generators, including a level generator, a pulse generator, and a ramp generator structured to populate additional memories with further segment description codes. In some embodiments the segment description codes are combined in an adder to produce the final test pattern. Filters and limiters may also be included.

Other aspects of the invention include methods for generating a test pattern. Example methods begin by accepting input from a definition file that contains a description of a particular test pattern to be generated. The definition file may be a text or XML file. The definition file may include multiple selectable patterns within it or there may be multiple definition files to select from. Next, description information of the particular test pattern is retrieved from the definition file. A first memory is populated with segment description codes that describe segments of the particular test pattern, based on the retrieved segment description statements. Then a series of portions of the test pattern are produced by populating an output with data derived from one or more of the segment description codes. Further aspects include storing into a second memory indexes to lines or portions that make up the particular test pattern. In yet further aspects the test pattern is a video file that can be rendered on a display device.

Other aspects of the invention include systems and methods that receive a text definition file. Then pixel data is generated based on contents from the definition file. A final output retrieves the stored pixel data and sequentially generates the test pattern as an output.

DETAILED DESCRIPTION

A programmable parametric generator engine extends the concept of the fixed state machine algorithm-based FPGA generator by making the transition locations and amplitudes of the test patterns programmable. In this way, one flexible engine takes the place of many fixed engines. In looking at the patterns which are needed for present and future applications, several different types dominate, so specific engines within the generator are designed to meet the different needs.

FIG. 1 is a block diagram of a system for generating text defined test patterns according to embodiments of the invention. The programmable test pattern generator 100 includes one or more text-based pattern definition files; a single such file 110 is represented in FIG. 1, which, in some embodiments may be an XML file, although other markup languages could be used. In yet other embodiments nearly any text based files could be used for the definition file 110. It is convenient to use markup languages such as XML files because the overall format of such files lends itself well to using such files for pattern definition. Additionally, several free or low-cost XML editors are available to the system programmer to readily create and edit the definition file 110. The definition file 110 contains character text and numerical values that are readable by human operators.

The definition file 110 is parsed and decoded by a test pattern program 120, which may be implemented in hardware, such as an ASIC or programmed FPGA, or a software process running on an appropriate processor. The definition file 110 is constructed according to specifications of a schema file, which defines the specific set of XML tags and attributes used to describe the test pattern, as illustrated in detail below.

The test pattern program 120 opens, parses, and interprets the definition file 110 by the same rules embodied in the schema, then writes data to memory locations or registers within a parametric generator 130. The parametric generator 130 may be likewise implemented in a programmed FPGA, or a programmed general or special purpose processor. Although in most instances the test pattern generator 100 will be installed in a rack or "desktop" implementation, hand-held or portable implementations are likewise possible. In FIG. 1 a memory 132 in the parametric generator 130 is illustrated as a single memory, although in practice the memory 132 may be distributed in multiple areas of the test pattern generator.

An output engine 134, which may in fact contain multiple separate engines, runs on the test pattern generator 100 to generate a specific test pattern for a display 150. The display 150 receives the test pattern signal from the test pattern generator 100 and generates a test pattern image 152 within a display portion 154 of the display. Although this description is given with reference to providing test signals to a display 150, test signals can be generated using concepts of this invention for any of the types of video devices listed above. Further, although this description generally describes generating the "active" portion of test pattern signal for the display 150, i.e., the portion of the test pattern signal that can be seen on the display portion 154, embodiments of the invention may also be directed to generating other portions of the test pattern signal. For instance, a test pattern signal may additionally include synchronization and data information in the blanking regions outside the active portion of the signal. Embodiments of the invention can also be used to generate the synchronization or other data by using the concepts disclosed herein.

The test pattern generator 100 also includes a user interface 140, which may be implemented in any fashion. In the illustrated environment a two-line text display 142 presents information from a menu program operating on the test pattern generator 100. Control buttons 144 allow the user to control the operation of the test pattern generator 100, including the ultimate test pattern signal that the test pattern generator delivers to the display 150. The user interface 140 allows the user to set the current test pattern, size, color space, raster structure (progressive, interlaced), and operating mode, for instance. In some embodiments buttons specific to a dedicated function may be part of the user interface 140. For example a test pattern button (not illustrated) may cycle through various standard test patterns such as color bar, linearity, flat field, etc.

Once selected by the user, the desired operating parameters of the test pattern generator 100 are provided to the test pattern program 120 so that it may load the appropriate data into the memory 132 of the parametric generator 130 so that ultimately, the desired test pattern is presented to the display 150 in the requested video format.

Figure 2:
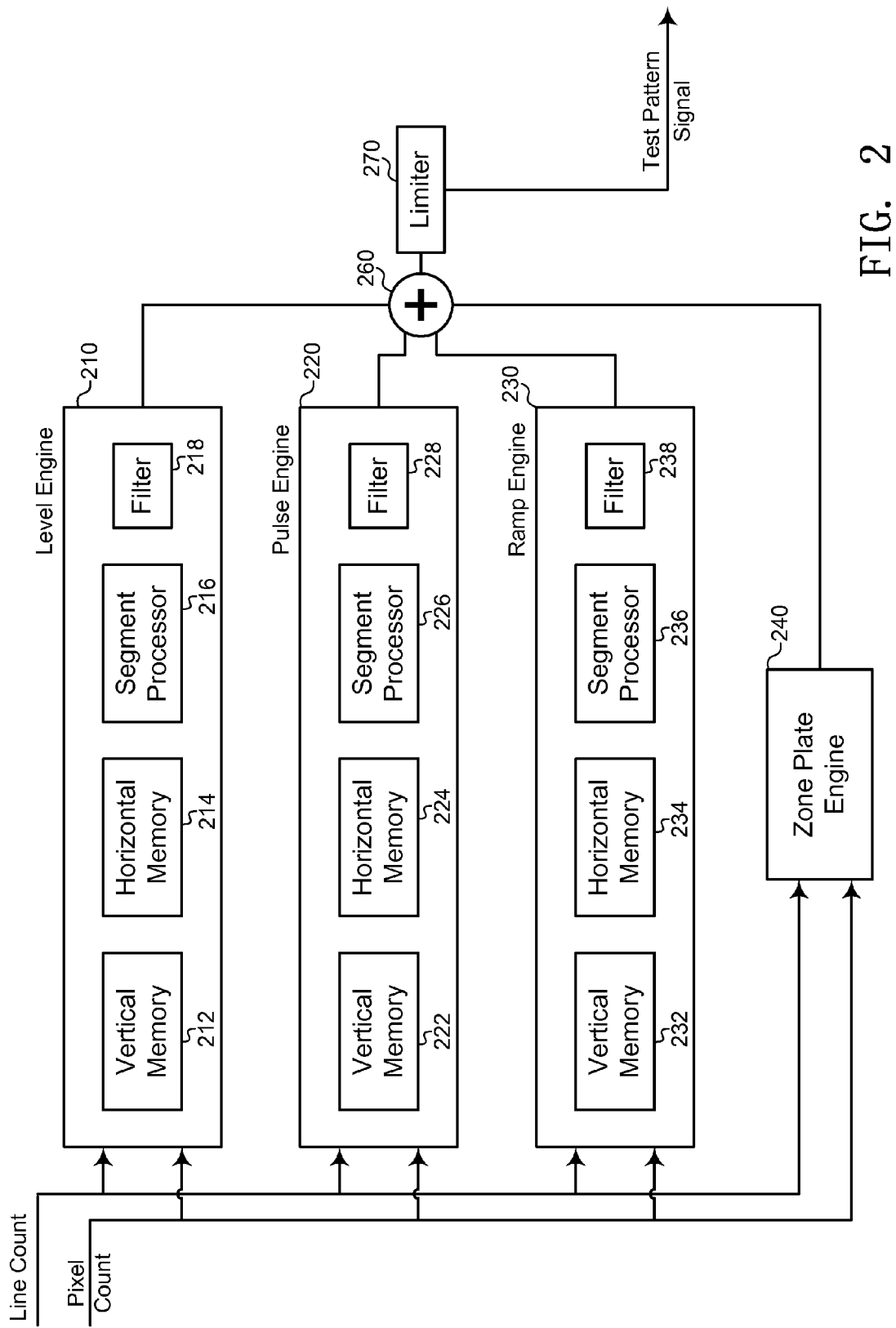
FIG. 2 is a block diagram of example pattern engines that may be incorporated in the test pattern generator illustrated in FIG. 1, according to embodiments of the invention.

FIG. 2 is a block diagram of example pattern engines that may be incorporated in the parametric generator 130 according to embodiments of the invention. Three separate pattern engines are illustrated in FIG. 2, although implementations may have more or fewer engines. A zone-plate engine is illustrated separately, and, in some embodiments, functions differently from the other illustrated engines. The illustrated engines include a level engine 210, a pulse engine 220, and a ramp engine 230. The zone plate engine is labeled 240. Each of the three main engines includes separate vertical and horizontal memories, also referred to as parametric engine memories. Further, each engine 210, 220, and 230 includes a segment processor as well as a filter, the functions of which are described below, with reference to both FIGS. 1 and 2.

Outputs from the engines 210, 220, 230, and 240 are combined in a combiner 260. In practice, the output from each of the engines 210, 220, 230, and 240 is a set of values which may simply be added together, as described in detail below. Finally, a limiter 270 ensures that the combined output of all the engines 210, 220, 230, and 240 does not exceed a minimum or maximum value able to be accepted by the display 150 for the selected pattern and mode.

Turning to the individual engines of the test pattern generator illustrated in FIG. 2, the level engine 210 creates signals that have transitions between different flat areas of the picture 154 of the display 150. Color bars is a common example. The standard color bars pattern has eight vertical bars with a uniform signal in each bar region. So, the output of the pattern generator 100 is constant for ⅛th the width of the screen, then transitions to a new color, holds that for ⅛th the width then changes and so on. In prior art systems, the levels that define the colors, and the horizontal location of the transition points between them, would need to be hard coded in the FPGA for a given standard. In the embodiments of the invention, the eight bars are considered individual segments of a horizontal line. Each segment is programmed to start on a given location, and be at a certain level. So to make color bars, the test pattern program 120 programs the parametric generator 130 to generate a segment of white, then a segment of yellow, then one of cyan, and so on to make one line of video. A direct benefit of this design feature is that a single test pattern within the definition file 110 can be used for any format, mode, or raster size, no matter the size or format of the display. For instance, the same color bar test pattern can be used for both High Definition and Standard Definition frame sizes because the color transitions for the color bars are generated based on relative sized widths (e.g. ⅛ of the screen), rather than absolute sizes (e.g 80 pixels).

The transitions from the first block of the level engine 210 are implemented as steps. The steps may then be filtered, such as by the level engine filter 218, to make appropriately shaped edges to meet the band-limiting requirements of the currently selected video formats. These filters are programmable by the test pattern program 120 to allow the shaping to be tailored for each application. In some applications it is desired to not filter the edges, so that option is also allowed. The values illustrated in FIGS. 3A and 3B are examples of values before filtering takes place.

In order to make standard color bars, only 8 segments are needed. Some color bar signals need several patterns on different lines of the raster, so several independent line definitions are used. To allow for reasonably complex patterns, embodiments of the invention can be implemented such that the level engine 210 supports 32 unique lines, each with up to 32 segments. Of course other implementations are possible and still fall within the scope of the invention. These segments are stored in a horizontal memory block 214 of the level engine 210. The test pattern program 120 (FIG. 1) may be the process that stores data in the memory blocks 212, 214 of the output engine, for example the level engine, or it could be another process that stores the data. In some embodiments, both the vertical and horizontal memories of the engines can be implemented as dual-bank memories, which allows the previous test pattern to be shown on the display 150 while the test pattern generator 100 is programming a newly selected pattern. Single-bank embodiments could instead show a black or otherwise default signal on the display 150 while the new pattern was being programmed. Implementations without dual-bank memory would cause disruptions in the test pattern signal during times when the new pattern was being programmed into the memories 212, 214.

After a number of video lines have been defined, embodiments of the invention specify on which line or lines of the test pattern signal they will be displayed. For this function, in an example embodiment the level engine 210 (and the other engines) uses a vertical look-up table. Since in this example there are 32 unique possible lines in the engines, each line of the test pattern signal is allowed to point to any of the 32 defined signal lines. So for a 1080 line test pattern signal, each line may point to any of the 32 lines that have been defined. The vertical and horizontal memories 212, 214 are quite small, and, in embodiments of the invention that use an FPGA to implement the parametric generator 130, may be economically implemented as a memory blocks inside the FPGA.

Although the above embodiments have been described as a process where XML input is interpreted to create compact segment and line descriptions in horizontal and vertical memories, it is also possible that the same or similar XML descriptions could be interpreted to fill a memory that contains one or more lines of the actual pixel by pixel values of the desired output. In other words, the parametric generator 130 (FIG. 1) could generate individual pixels in a memory (not illustrated) that could then be sequentially output to create the test pattern.

In an example embodiment of the invention, in the engine 210, a segment processor block 216 uses a line count and pixel count to read from the vertical and horizontal memories 212, 214, and creates an unfiltered or pre-filtered version of the output for the engine. For example, during a horizontal blanking period, the segment processor 216 of the level engine 210 reads the vertical memory 212 to determine which line definition should be used for the next line. The segment processor 216 then reads the first three segments for that line into internal buffers (not illustrated). When the start of the active line occurs, the segment processor 216 compares the current pixel counter to the first segment start value. When the values match, the segment processor 216 applies the levels for the first segment to the output (or to the filter 218), and reads another segment into the buffers. On the next pixel, the segment processor 216 begins comparing the current pixel counter to the second segment's start value. When the values match, the levels for the second segment are applied to the output. This process repeats until the last segment ends at the end of the current line. In this way each segment of each line can define levels of arbitrary length and magnitude. In a particular embodiment, the buffer is sized to store three segments, which allows short segments to be processed without additional memory calls.

An example output of one color channel of the level engine 210 is illustrated in FIGS. 3A and 3B. With reference to these figures, a segment 0 begins at pixel number 0, referred to in FIG. 3B as the start sample location. A level column in FIG. 3B indicates that the output level for segment 0 remains at a constant zero value, which is illustrated in FIG. 3A. Segment 1 begins at pixel number 100 and jumps to a 4000 level, which is held for 400 pixels. Each segment defines values for three different levels, one for each color channel. The effect on the test pattern signal is that the first 100 pixels of the horizontal line generated in this example has a first, static, color, then the next 400 pixels of the same line changes to another color, which is also static. This color generation process continues through the last segment and the end of the line. In this example, only four segments are illustrated, but in the example implementation described above, up to 32 different segments can be defined for each line.

Returning back to FIG. 2, output from the pulse engine 220 is used independently, or can be added to the output of the level engine 210 to create variations from the flat color output generated by the level engine, and, in particular, modification that appear in the test pattern signal as pulses. Pulses are typically sharp and symmetrical, but may be modified as desired in the system. The pulse engine 220 follows the same principles as the level engine 210, described above, except that each segment defines the location and amplitude for a pulse instead of a step to a level. This engine 220 is used to create signals in the test pattern like convergence, which is a grid of horizontal and vertical lines. In a convergence pattern, the horizontal lines are made from the level engine 210, but the vertical lines are a series of pulses on each line.

In an example embodiment, the pulse engine 220 creates up to 8 unique lines, each with up to 32 pulses, although other implementations are possible, of course. Similar to the level engine 210, the output of the pulse engine 220 has a programmable filter 228 to shape its particular output signal. This allows implementing various shapes as needed to meet the video system test requirements.

A segment processor 226 of the pulse engine 220 operates similarly to the segment processor 216 of the level engine 210. Differently, though, is that particular segments in the pulse engine 220 define a single pixel-wide pulse, and an amplitude parameter describes the height of the pulse. On each line, the pulse segment processor 226 compares the current pixel counter to the segment start value read from the horizontal memory 224. When the pixel counter reaches the prescribed segment start value, the segment processor 226 outputs a pulse that is one pixel wide, at an amplitude that was also prescribed. Further segments are then processed until all of the segments and the line is complete.

FIGS. 4A and 4B illustrate example output for one color channel of the pulse engine 220. As can be seen in FIG. 4B, the output begins at zero with segment 0. At pixel count 100, segment 1 describes a single pixel-wide pulse having an amplitude of 3000. Then, at pixel count 500, segment 2 describes a negative pulse having an amplitude of 3000, as is illustrated in FIG. 4A. The values illustrated in 4B are pre-filtered values. The end effect of the pulses on the test pattern is to have a very narrow area that changes colors rapidly. When multiple pulses are aligned, such as vertically or diagonally, the test pattern appears as a line. Positioning where the pulses occur in each line allows the test pattern designer to define where the lines will appear on the test pattern.

Returning again to FIG. 2, the ramp engine 230 is a little different from the others. Instead of a level, this engine is programmed with an increment or decrement value. So each segment has a start location, typically measured in pixels, and the amount to increase or decrease on each subsequent pixel, as illustrated in FIGS. 5A and 5B. On the next segment the slope can change. So, to program a flat spot (i.e., constant color output) simply program a slope of zero. The ramp engine 230 is used to make signals such as linear ramps that test the resolution, range and linearity of systems. It can also be programmed with a very large slope to step up or down to quickly get to a level, as in returning to black after a long slow ramp up. As with the other engines, the output of the ramp engine 230 is also processed by a programmable filter 238. This is done to ensure the signal is properly band-limited, especially if large increments are used.

A segment processor 236 of the ramp engine 230 operates much the same as the other segment processors described above, except that each segment describes the start pixel and an increment value. The processing begins when the ramp segment processor 236 compares the current pixel counter to the start value for the first segment. When they match, the segment processor 236 adds the increment value to the current output value. It continues to add the increment on each pixel. When the current pixel counter matches the next segment's start value, the increment for the next segment is added to the output on each successive pixel until a new segment is started, or until the end of the line is reached. As with the other engines, each time a new segment is started, another segment's data is read into the buffers to be ready for later use by the engines, and the segment processor continues to the last segment and the end of the video line. Example output of the ramp engine 230 is illustrated in FIGS. 5A and 5B, which, similar to above, illustrates pre-filtered values of the ramp engine.

The inclusion of the zone-plate engine 240 in the embodiment of the test pattern generator illustrated in FIG. 2 signifies that embodiments of the invention may be used in conjunction with conventional test pattern generators. In other embodiments a zone-plate video test pattern may be generated from a definition file used by one or more of the engines 210, 220, 230 above to create the desired zone-plate pattern.

As mentioned above, the combiner 260 combines the outputs from the multiple engines to produce a common output. In an example embodiment, the output from the level engine 210 is a number including an offset in the signal that is interpreted by the test pattern signal to cause a black signal to be generated on the display 150. Thus, the output from the engine 210 contains the black or other desired offsets. Output from the other engines 220, 230, and 240 may be in twos-compliment form, or other form that allows for positive and negative numbers, which makes it relatively easy for the combiner 260 to simply add the outputs from the engines together. For many test patterns the output from the pulse engine 220, ramp engine 230, and zone plate 240 will be zero, and thus the output from the level engine 210 will be generating the entire test pattern signal of the test pattern generator 130. In some embodiments, when using the zone plate engine 240, the level engine 210 outputs a 50% grey field, and the bi-polar outputs of the zone plate add or subtract from that base to create the full output signal.

Combining the outputs from the engines 210, 220, 230, 240 in such a way allows two ways of combining signals, matrix and additive. In matrix form, the vertical memory of the various engines can assign level, pulse, and ramp engine lines to different parts of the image. So for example in SMPTE RP 219 color bars there are some lines with bar signals generated by the level engine 210, and there are other lines which have ramps generated by the ramp engine 230.

In additive form, the outputs of the engines are on the same line and add together. For example on a pulse and bar portion of an image, there is a positive pulse near the beginning of the line. Then there is a bar that covers about ½ the line. During the bar there is a negative pulse. To make this signal, the bar is created in the level engine 210, and then the two pulses are created in the pulse engine 230. The vertical memory selects those defined signals from both the level and pulse engines 210, 230, to be present on the same raster lines of the output, so the level and pulse components add together to make the combined video signal.

As described above, and with reference back to FIG. 1, the test pattern signal ultimately output by the test pattern generator 100 is first defined in the definition file 110, which is in turn read by a test pattern program 120. The test pattern program 120 "programs" the test parametric generator 130 by inserting various data and codes into appropriate memory or storage locations in the parametric generator. The parametric generator 130 then interprets the programmed line and segment parameters within it to create each line of the test pattern signal in real time.

Figure 6B:

FIGS. 6A and 6B together illustrate an example XML file 111, which may be used as the test pattern text file 110 in embodiments of the invention. In particular, the XML file 111 describes the SMPTE RP 219 test pattern. As described above, the particular file format and structure is irrelevant for the invention, but XML files include qualities that make it a particularly useful choice. Note that all of the characters in the example definition file 110 are human readable, and, in this particular example, are all alphanumeric.

With reference to FIGS. 6A and 6B, when defining a video test pattern, image locations such as lines and pixels along a line can be defined either specifically (e.g. line 50) or generically as either a fraction or percentage of maximum (e.g. "½" or "50%"). When the image is then rendered in any given resolution, the generic location terms are converted by the test pattern program 120 into specific pixel-accurate locations.

Similarly, colors used in the definition of a signal can be defined in any color space (e.g. YCbCr, GBR/RGB or XYZ) and any bit resolution (e.g. 8-bit, 10-bit or 12-bit), as either specific color values (e.g. gbr10="940,64,64" would be green, defined as 10-bit RGB values) or as a decimal fraction or percentage of maximum (e.g. rgb="1.0,0,0" or rgb="100%,0%,0%" would be red).

Also with reference to FIG. 1, details of the test pattern program 120 will now be described, with reference to example processes provided in FIGS. 7 and 8. In general, when any given test pattern definition file 110 is selected by the user, the test pattern program 120 parses the file, converts any generically defined locations into format-specific locations, converts any colors defined in the signal (either generically or specifically) to the selected output color space if necessary and programs the output engines 134 within the parametric generator 130 to generate the selected signal. The signals can optionally be filtered to prevent ringing using one of a set of pre-defined broadcast filters, or one or more custom filters defined in the definition file 110.

Figure 7:
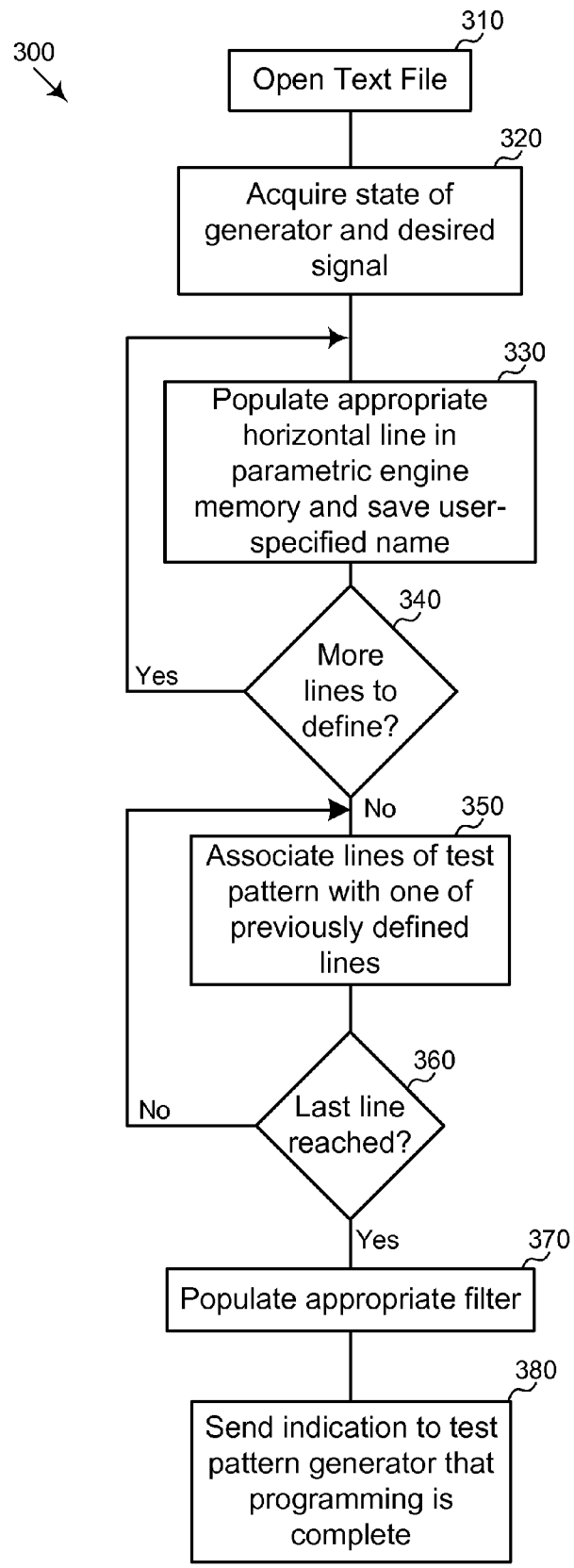
FIG. 7 is a flow diagram illustrating example processes used by embodiments of the invention.

FIG. 7 illustrates example processes in a flow 300 that may be performed by the test pattern program 120. The example processes need not be performed in the exact order illustrated. The flow 300 begins at a process 310 in which the test pattern definition text file 110 is opened. Next, the present state of the test pattern generator 100 is acquired, along with a user selection of which test pattern is to be displayed, in a process 320.

In process 330, the test pattern program 120 interprets the definitions in the definition file 110, populates segments for an appropriate horizontal line in parametric engine memory and associates a particular name with the line. A more detailed description of this process is illustrated in FIG. 8, described below. After the horizontal line is defined in the parametric engine memory, a process 340 determines if more lines need to be defined.

A process 350 interprets additional portions of the test pattern definition file 110 and associates lines of intended test pattern with one of the lines previously defined in parametric engine memory in the process 330. As described above, recall that, in the described example for the level engine 210, 32 different lines may be defined in parametric engine memory, therefore the process 350 assigns one of the 32 defined lines to each of the lines of the test pattern. Other implementations may store more or fewer lines in the parametric engine memory.

An example embodiment of the invention explains the process in more detail. In the example embodiment, vertical locations of the desired test pattern are specified by one or more of the "lines" or "linesX" attributes within the <pattern> tag, (FIG. 6A) where "X" is a selection of vertical raster sizes (480, 576, 720, or 1080, for example). Each of these variants of the "lines" attribute contain comma-separated lists of line values or line ranges (start and end line values separated by a hyphen, e.g. "10-20"). These line values can be provided in units of absolute lines, as a percent of raster size using the "%" suffix or as a fraction of raster size using fractional notation (e.g. "⅝").

Lines are zero-indexed, so the lines from the top edge to the bottom edge of a 1920×1080 signal would be numbered 0 through 1079 respectively. If this <pattern> tag is contained within a <frame> tag, then the line values should fall within the full range of active video lines. If lines are defined within the context of a <field1> or <field2> tag, then the line values should fall within the active video lines of those respective fields. For example: lines="2" defined within the context of a <frame> tag will be active picture line 2, defined within the context of a <field1> tag will be active picture line 3, and defined within the context of a <field2> tag will be active picture line 4 as shown in Table 1 below. Additionally, the <signal_polarity> tag uses "line" and "lineX" attributes which follow the same rules as "lines" and "linesX" attributes but may only specify a single line rather than a range of lines.

TABLE 1

| Vertical line mappings | | | |
|---|---|---|---|
| Active Picture Line # | <frame> Line # | <field1> Line # | <field2> Line # |
| 0 | 0 | 0 | — |
| 1 | 1 | — | 0 |
| 2 | 2 | 1 | — |
| 3 | 3 | — | 1 |
| ... | | | |
| 1076 | 1076 | 538 | — |
| 1077 | 1077 | — | 538 |
| 1078 | 1078 | 539 | — |
| 1079 | 1079 | — | 539 |

When lines are calculated from fractional or percent of raster size definitions, all calculations are rounded down to the nearest whole line. In the above embodiment, the start of a range of lines is always inclusive (the start line affected); however the end of a range is inclusive when a specific line number is given, but exclusive (end of range is not affected) when a fraction or percentage is given. This is done to prevent overlapping regions when <pattern> tags are defined as a series of fractional or percentage spans (e.g. 0-50% followed by 50%-100%). In one particular embodiment, if two <pattern> tags do overlap each other, whichever tag appears later in the signal definition will take precedence.

Where lines must be defined for a <pattern> tag, only one of these five versions of the "lines" attribute need be defined, but multiple attributes may be defined if desired. When a test signal is generated in a given raster size, if a "linesX" attribute has been defined where "X" exactly matches the output raster height, those line mappings will be used. If no "linesX" attribute has been defined that exactly matches the requested output raster size, then the line mapping provided by the "lines" (no height specified) will be used instead. Any line that does not have content from a given engine explicitly mapped to it will default to blank content for that engine.

The specific XML example of the definition file 110 illustrated in FIGS. 6A and 6B is but one example of how a particular test pattern is coded. Alternative syntax could also be used to achieve similar results.

Returning back to FIG. 7, after the lines of the desired test pattern have been mapped, a process 360 ensures that each line that was defined in the definition file 110 has been assigned. A process 370 populates an appropriate filter in the parametric generator 130 to properly define the transitions in the test pattern signal so that they are within the specifications of the particular test pattern and display type. Finally, a process 380 sends an indication or otherwise sets a state in the test pattern generator 100 that the programming is complete, and that the desired test pattern is ready to be output on the test pattern signal to be shown on the display 150.

Figure 8:
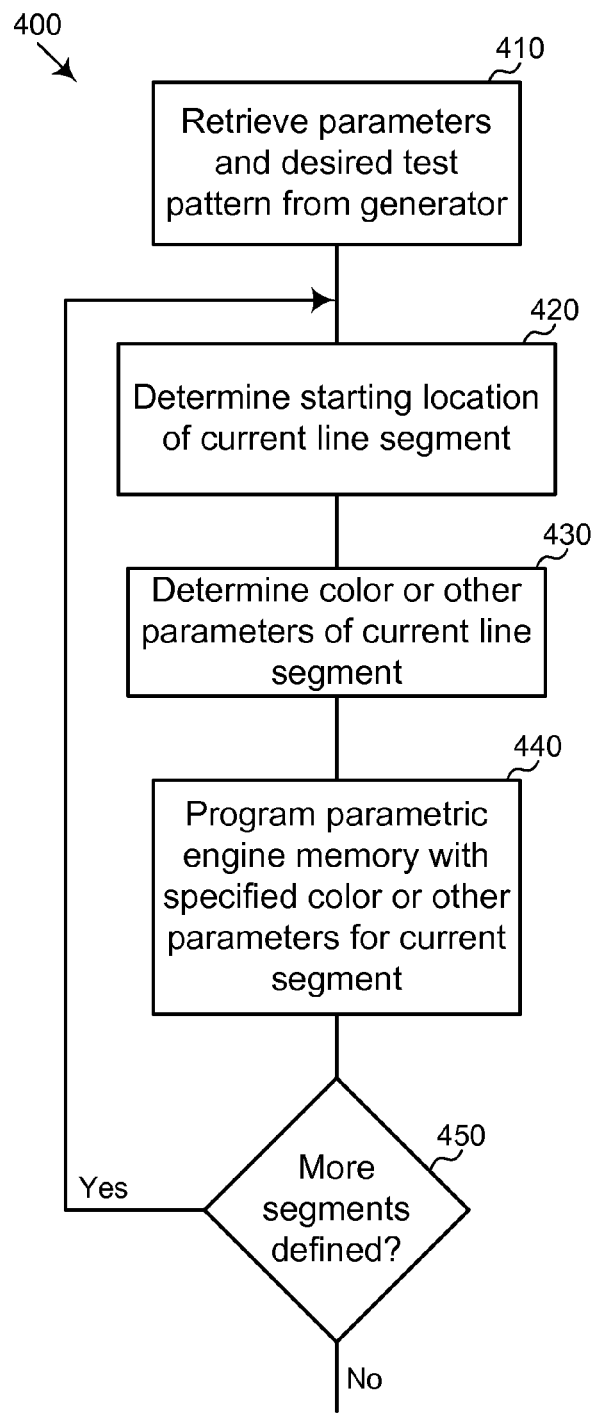
FIG. 8 is a flow diagram illustrating example processes used by embodiments of the invention.

FIG. 8 is a flow diagram illustrating example processes used in the process 330 of FIG. 7 to build a set of horizontal line segment definitions in the parametric engine memory of the pattern generator 130.

A flow 400 begins at a process 410 where parameters for the desired test pattern are acquired. As described above, the desired test pattern may be set from the user interface 140 or other form of user input. The parameters of the test pattern signal may include resolution of the display, including line width and number of lines, bit depth, color space, and raster structure, for instance.

In an example embodiment, a process 420 evaluates a starting position of subsequent segment begins or when the end of the video line is reached. Horizontal locations are specified by one or more of the "start" or "startX" attributes within the various segment tags, such as illustrated in FIGS. 6A and 6B, where "X" is a selection of horizontal raster sizes (720, 1280, 1920 or 2048, for example, though other sizes are possible). Each of these variants of the "start" attribute specify the first pixel that the containing segment is active on prior to filtering; for the level engine 210, this represents the 50% point of a transition between two levels and for the pulse engine 220 this represents the center of the pulse. In some embodiments, these start values can be provided in units of pixels (using the "px" suffix), in units of microseconds (using the "us" suffix), as a percent of raster size (using the "%" suffix) or as a fraction of raster size (using fractional notation (e.g. "⅝")).

In this example embodiment, pixels are zero-indexed, so the pixels from the left edge to the right edge of a 1920×1080 signal are numbered 0 through 1919. When pixels are calculated from fractional or percent of raster size definitions, all calculations are rounded down to the nearest whole pixel. If generically defined (e.g. % or fraction notation) start attributes in two adjacent segments evaluate to the same absolute pixel location, the second segment will be shifted one pixel to the right so as not to overlap the entire previous segment. In some embodiments, where start locations are defined for a segment tag, only one of these six versions of the "start" attribute need be defined, but multiple attributes may be defined if desired. When a test signal is generated in a given raster size, if a "startX" attribute has been defined where "X" exactly matches the output raster width, that start location will be used. If no "startX" attribute has been defined which exactly matches the requested output raster size, then the start location provided by the "start" (no width specified) will be used instead.

As detailed above, alternative syntax in the definition file 110 could also be used to achieve similar results.

A process 430 determines the desired color of the current line segment from the test pattern text file and populates the parametric engine memory of one of the engines (FIG. 2) appropriately. Color may be specified in signed or unsigned YCbCr, GBR, RGB or XYZ color spaces, and may be specified for particular bit depths, or may be described as bit depth agnostic.

A process 440 next populates the appropriate memory with the color and start position data for the current segment of the current line. The process 450 ensures that all segments defined in the test pattern definition file 110 are populated. The maximum number of segments possible to be defined need not be reached for every line definition, and any unused segments are left un-programmed and ignored.

The above description has been given with reference to static test patterns, yet embodiments of the invention may also be used to incorporate motion of or within test patterns as well. In this mode, the active picture may move horizontally, vertically, or both. So a feature that was at the start of the line will move across the screen, exit from one side and re-appear on the other. An equivalent effect happens on vertical motion. Items on a given line move up or down, then exit and re-appear. In effect this is rolling the start point for the line and frame around within the defined image.

In an example embodiment, to accomplish this for vertical motion is relatively straightforward by adding an offset to the line counter. To accommodate the horizontal motion, the engines (FIG. 2) pre-read the segments to find the segment containing the current start point. On each line this is done in the horizontal blanking time, for instance. This is especially challenging on the ramps, where the circuit must multiply the segment increment by the segment length to calculate the output level generated by each segment. The levels of each successive segment are accumulated, i.e., added, until the current starting point is reached, which will be the starting output level for the line.

An additional difficulty of allowing motion on the signal is ensuring proper shaping on the ends of the line. The engines in the parametric generator 130 provide a programmable edge mask to force a narrow blanking region on the left and right ends of the raster which allows the filters to correctly shape these edges even when motion is active. On previous generators the signal would not be edge shaped on the ends which could create undesirable ringing.

Although the above description has been described with reference to generating test patterns for display, concepts of the invention are not limited to such outputs. For example, instead of a display, the ultimate output could be a pattern printed on various media. In one example the definition file 110 (FIG. 1) could contain the definitions for a "chip chart" that is ultimately printed on a high-quality paper printer. Chip charts are commonly used in areas such as photography and printing, and can be easily produced and modified to suit particular needs using embodiments of the invention. Other embodiments could be used to produce color monitor charts so that a computer monitor could be adjusted to a known color standard represented on the monitor chart. Embodiments of the invention could also be used in scanning technologies. For example, some scanners include a feature of comparing a current scan to a reference scan. The scans are compared and elements common to both scans are resolved in favor of the current scan. For instance if a scanning bed has a known defect, a definition file 110 can be generated that describes that defect. Then, when a scan is compared to the generated defect image, the scans may be subtracted from one another, yielding a modified scan that does not include the defect.

Yet other embodiments are directed to generating audio outputs. A definition file contains definitions of the desired audio. Then, a program reads the definition file. The parametric generator populates, for example, a memory with data representing various tones, frequencies and sound durations described in the definition file. During playback the stored memory pattern is converted into audio sounds, and distributed to the user, such as though a speaker, with or without use of an audio amplifier.

As can be seen multiple variations exist using concepts of the invention.

Some embodiments of the invention have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out herein.

What is claimed is:

1. A system for generating test patterns, the system comprising:
   an input structured to accept a text definition file that contains a series of attributes of a particular test pattern to be generated, the particular text definition file including one or more segment description statements;
   a generator structured to retrieve the series of attributes from the text definition file and populate a first memory with segment description codes describing segments of the particular test pattern based on the retrieved segment description statements; and
   a segment processor structured to produce an output of a series of portions of the particular test pattern by, for each of the portions of the particular test pattern, creating the portion from the segment description codes in the first memory.

2. The system for generating test patterns according to claim 1 in which the particular test pattern is a video pattern and in which the portions correspond to lines of the video pattern.

3. The system for generating test patterns according to claim 1 in which the text definition file is an XML file.

4. The system for generating test patterns according to claim 1, further comprising a second memory structured to store a representation of the particular test pattern by storing one or more indexes to the portions that make up the particular test pattern.

5. The system for generating test patterns according to claim 1 in which the first memory stores segment description codes for segments having a base color value.

6. The system for generating test patterns according to claim 1, further comprising:
   a second generator structured to retrieve the series of attributes from the text definition file and populate a second memory with additional segment description codes; and
   a second segment processor structured to produce enhancements to the series of portions of the particular test pattern.

7. The system for generating test patterns according to claim 1 in which the generator is a level generator, the system further comprising:
   a pulse generator structured to retrieve the series of attributes from the text definition file and populate a second memory with additional segment description codes;
   a second segment processor structured to produce enhancements to the series of portions of the particular test pattern;
   a ramp generator structured to retrieve the series of attributes from the text definition file and populate a third memory with additional segment description codes; and
   a third segment processor structured to produce further enhancements to the series of portions of the particular test pattern.

8. The system for generating test patterns according to claim 7, further comprising a combiner structured to add outputs from the second segment processor and the third segment processor.

9. The system for generating test patterns according to claim 1, further comprising a filter structured to modify data of portions of the particular test pattern.

10. The system for generating test patterns according to claim 1, further comprising a limiter structured to prevent sending a test pattern that is outside of predetermined limits.

11. The system for generating test patterns according to claim 1 in which the text definition file comprises pattern definition statements.

12. A method for generating a test pattern, the method comprising:
   accepting input from a text definition file that contains a series of attributes of a particular test pattern to be generated, the series of attributes of the particular test pattern including one or more segment description statements;
   retrieving the series of attributes from the text definition file and populating a first memory with segment description codes describing segments of the particular test pattern based on the retrieved segment description statements; and
   producing an output of a series of portions of the particular test pattern by, for each of the portions, inserting data into the output that is derived from one or more segment description codes.

13. The method for generating a test pattern of claim 12, further comprising: storing into a second memory an index of portions that makes up the particular test pattern.

14. The method for generating a test pattern according to claim 12 in which accepting input from a text definition file comprises accepting input from an XML file.

15. The method for generating a test pattern according to claim 12 in which populating a first memory with segment description codes comprises populating the first memory with level description codes, the method further comprising:
   populating a second memory with ramp description codes; and
   populating a third memory with pulse description codes.

16. The method for generating a test pattern according to claim 15, in which the test pattern includes components derived from one or more of the level description codes, the ramp description codes, and the pulse description codes.

17. The method for generating test patterns according to claim 12, further comprising limiting the generated test pattern to predetermined limits.

18. The method for generating test patterns according to claim 12, further comprising:
   receiving an input for selecting the particular test pattern to produce out of a plurality of possible test patterns to produce.

19. The method for generating test patterns according to claim 12, in which the text definition file comprises a plurality of possible test patterns to produce.

20. The method for generating video test patterns according to claim 12, in which accepting input from a text definition file comprises accepting input from one of a plurality of text definition files.

21. A method for generating a video test pattern, the method comprising:
   accepting input from a text definition file that contains a series of attributes of a particular video test pattern to be generated, the series of attributes of the particular video test pattern including one or more segment description statements;
   retrieving the series of attributes from the text definition file and populating a first memory with segment description codes describing the segments of the particular video test pattern based on the retrieved segment description statements;
   populating a second memory with line definitions of the particular video test pattern, each line definition described by one or more segments of the particular video test pattern; and producing an output of a series of horizontal lines of the particular video test pattern by, for each of the series of horizontal lines of the particular video test pattern, inserting data into the output derived from the line definitions of the second memory.

22. The method for generating video test patterns according to claim 21 in which accepting input from a text definition file comprises accepting input from an XML file.

23. A system for generating video test patterns, the system comprising:
    an input structured to accept a text definition file that contains a series of attributes of a particular test pattern to be generated;
    a generator structured to retrieve the series of attributes from the text definition file and populate a memory with pixel data representing portions of the particular test pattern; and
    an output processor structured to retrieve the pixel data from the memory and to sequentially output the particular test pattern based on the pixel data.

24. The system for generating video test patterns of claim 23 in which the text definition file is an XML file.

25. The system for generating video test patterns of claim 23 in which the text definition file contains pattern statements.

26. A method for generating video test patterns, comprising:
    accepting a text definition file that contains a series of attributes of a particular test pattern to be generated;
    retrieving the series of attributes from the text definition file;
    generating pixel data representing portions of the particular test pattern based on the retrieved series of attributes in an image generator;
    populating a memory with the generated pixel data;
    retrieving the pixel data from the memory; and
    sequentially outputting the particular test pattern based on the retrieved pixel data.

27. The system for generating video test patterns of claim 26 in which accepting a text definition file comprises accepting an XML file.

28. The system for generating video test patterns of claim 26 in which the text definition file contains pattern statements.

29. A method for generating a test pattern, the method comprising:
    accepting input from a file that contains a textual definition of a particular test pattern to be generated, the textual definition including one or more segment description statements that define a portion of the test pattern;
    retrieving the textual definition from the text definition file and populating a first memory with a plurality of portions of the test pattern based on the retrieved segment description statements; and
    producing an output of a series of portions of the particular test pattern by, for each of the portions, inserting data into the output that is derived from one or more segment description codes.

* * * * *